(12) United States Patent
Zheng et al.

(10) Patent No.: US 11,039,320 B2
(45) Date of Patent: Jun. 15, 2021

(54) SCALABLE EVOLVED PACKET CORE

(71) Applicant: Casa Systems, Inc., Andover, MA (US)

(72) Inventors: Wenxing Zheng, Andover, MA (US); Gibson Ang, Andover, MA (US)

(73) Assignee: Casa Systems, Inc., Andover, MA (US)

( * ) Notice: Subject to any disclaimer, the term of this patent is extended or adjusted under 35 U.S.C. 154(b) by 30 days.

(21) Appl. No.: 15/932,354

(22) Filed: Feb. 16, 2018

(65) Prior Publication Data

US 2018/0255463 A1 Sep. 6, 2018

Related U.S. Application Data

(60) Provisional application No. 62/459,750, filed on Feb. 16, 2017.

(51) Int. Cl.
*H04W 16/02* (2009.01)
*H04W 28/08* (2009.01)
(Continued)

(52) U.S. Cl.
CPC ........ *H04W 16/02* (2013.01); *G06F 9/45558* (2013.01); *G06F 9/5005* (2013.01);
(Continued)

(58) Field of Classification Search
None
See application file for complete search history.

(56) References Cited

U.S. PATENT DOCUMENTS 7,933,983 B2 4/2011 Steele et al.
8,693,398 B1 4/2014 Chaganti et al.
(Continued)

FOREIGN PATENT DOCUMENTS

CN 105553849 A 5/2016
JP 2009-278297 A 11/2009
(Continued)

OTHER PUBLICATIONS

PCT/US2018/018468, dated May 11, 2018, International Search Report and Written Opinion.
(Continued)

*Primary Examiner* — Angela Nguyen

(74) *Attorney, Agent, or Firm* — Wolf, Greenfield & Sacks, P.C.

(57) ABSTRACT

The techniques described herein relate to methods, apparatus, and computer readable media configured to provide a distributed core framework for a voice and data network. A control plane comprising a set of control plane components is executed using a set of virtual machines running on a set of computing devices. The control plane comprises a first network interface to the voice and data network that is shared by the set of control plane components. A data plane comprising a set of data plane components is executed using a set of virtual machines running on a set of computing devices. The data plane comprises a second network interface to the voice and data network that is shared by the set of data plane components. Upon receipt of a session request from a remote device, a selected data plane component is selected to handle a corresponding session, such that the selected data plane component can directly communicate with the remote device using the second network interface to handle the session.

21 Claims, 12 Drawing Sheets

(51) Int. Cl.
*G06F 9/455* (2018.01)
*G06F 9/50* (2006.01)
*H04W 84/04* (2009.01)

(52) U.S. Cl.
CPC ..... *H04W 28/08* (2013.01); *G06F 2009/4557* (2013.01); *G06F 2009/45595* (2013.01); *H04W 84/042* (2013.01)

(56) References Cited

U.S. PATENT DOCUMENTS

| | | | |
|---|---|---|---|
| 9,639,589 B1* | 5/2017 | Theimer | G06F 11/1461 |
| 2012/0300615 A1 | 11/2012 | Kempf et al. | |
| 2012/0303835 A1 | 11/2012 | Kempf et al. | |
| 2013/0266049 A1* | 10/2013 | Fox | H04L 12/2885 375/222 |
| 2015/0063166 A1 | 3/2015 | Sif et al. | |
| 2016/0174198 A1 | 6/2016 | Akiyoshi et al. | |
| 2016/0335111 A1 | 11/2016 | Bruun et al. | |
| 2017/0054636 A1 | 2/2017 | Akiyoshi | |

FOREIGN PATENT DOCUMENTS

| | | |
|---|---|---|
| WO | WO 2015/004921 A | 1/2015 |
| WO | WO 2015/122177 A | 8/2015 |

OTHER PUBLICATIONS

International Search Report and Written Opinion dated May 11, 2018 in connection with International Application No. PCT/US2018/018468.

International Preliminary Report on Patentability dated Aug. 29, 2019 in connection with International Application No. PCT/US2018/018468.

Extended European Search Report for European Application No. 18754647.8 dated Dec. 17, 2020.

* cited by examiner

SCALABLE EVOLVED PACKET CORE

RELATED APPLICATIONS

This Application claims priority under 35 U.S.C. § 119(e) to U.S. Provisional Application Ser. No. 62/459,750, entitled "SCALABLE EVOLVED PACKET CORE" filed on Feb. 16, 2017, which is herein incorporated by reference in its entirety.

TECHNICAL FIELD

The techniques described herein relate generally to a scalable evolved packet core.

BACKGROUND OF INVENTION

An evolved packet core (EPC) is a framework for providing converged voice and data services for cellular networks, such as 4G and 5G networks. Physical EPC network deployments typically use dedicated physical devices and/or network cards to configure devices for the EPC network. Such devices and/or cards typically to handle both signaling and data aspects of the network. Therefore, for example, when adding a new card or device, both the data and control aspects are increased (e.g., even if it is only necessary to increase the data aspect and not the control aspect). Further, when adding an additional device or card, the data path may not easily flow among existing network devices and the new device (e.g., due to how the signaling is associated with each device).

As data applications increase in bandwidth consumption, it may be desirable to only add to the data aspects, and not also add to the control aspects (or vice versus). For example, if an application supports 4K video, the bandwidth usage may go up compared to other technologies (e.g., due to the amount of data consumed by 4K video), but the signaling may stay the same.

SUMMARY OF INVENTION

In accordance with the disclosed subject matter, apparatus, systems, and methods are provided for a scalable EPC that allows the data and signaling aspects to elastically and dynamically scale (e.g., according to network demand and/or network requirements).

Some embodiments relate to a computerized method for providing a distributed core framework for a voice and data network. The method includes executing a control plane comprising a set of control plane components associated with the control plane, comprising: executing the control plane components using a set of virtual machines running on a first set of computing devices associated with the control plane; and providing a first network interface for the control plane to the voice and data network, wherein the first network interface is shared by the set of control plane components. The method includes executing a data plane comprising a set of data plane components associated with the data plane, comprising: executing the data plane components using a set of virtual machines running on a second set of computing devices associated with the data plane; and providing a second network interface for the data plane to the voice and data network, wherein the second network interface is shared by the set of data plane components. The method includes receiving, via the first network interface, a session request from a remote device. The method includes processing, using a first control plane component from the set of control plane components, the session request to configure a selected data plane component from the set of data plane components to handle a session created for the session request, such that the selected data plane component can directly communicate with the remote device using the second network interface to handle the session.

Some embodiments relate to an apparatus configured to provide a distributed core framework for a voice and data network. The apparatus includes a processor in communication with memory and a set of additional processing resources. The processor is configured to execute instructions stored in the memory that cause the processor to execute a control plane comprising a set of control plane components associated with the control plane, comprising: executing the control plane components using a set of virtual machines running on a first portion of the set of processing resources; and providing a first network interface for the control plane to the voice and data network, wherein the first network interface is shared by the set of control plane components. The processor executes a data plane comprising a set of data plane components associated with the data plane, comprising: executing the data plane components using a set of virtual machines running on a second portion of the set of processing resources; and providing a second network interface for the data plane to the voice and data network, wherein the second network interface is shared by the set of data plane components. The processor receives, via the first network interface, a session request from a remote device. The processor processes, using a first control plane component from the set of control plane components, the session request to configure a selected data plane component from the set of data plane components to handle a session created for the session request, such that the selected data plane component can directly communicate with the remote device using the second network interface to handle the session.

Some embodiments relate to at least one non-transitory computer-readable storage medium. The at least one non-transitory computer-readable storage medium is encoded with a plurality of computer-executable instructions that, when executed, perform a method including executing a control plane comprising a set of control plane components associated with the control plane, comprising: executing the control plane components using a set of virtual machines running on a first set of computing devices associated with the control plane; and providing a first network interface for the control plane to the voice and data network, wherein the first network interface is shared by the set of control plane components. The method includes executing a data plane comprising a set of data plane components associated with the data plane, comprising: executing the data plane components using a set of virtual machines running on a second set of computing devices associated with the data plane; and providing a second network interface for the data plane to the voice and data network, wherein the second network interface is shared by the set of data plane components. The method includes receiving, via the first network interface, a session request from a remote device. The method includes processing, using a first control plane component from the set of control plane components, the session request to configure a selected data plane component from the set of data plane components to handle a session created for the session request, such that the selected data plane component can directly communicate with the remote device using the second network interface to handle the session.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION OF INVENTION

The inventors have recognized and appreciated that various techniques can be used to provide a scalable EPG solution that supports various wireless technologies, including 3G, 4G and 5G. Virtual functions can be used to execute data and control plane aspects of the EPG, allowing the EPG to independently scale and control the data and control plane functions.

Figure 1:
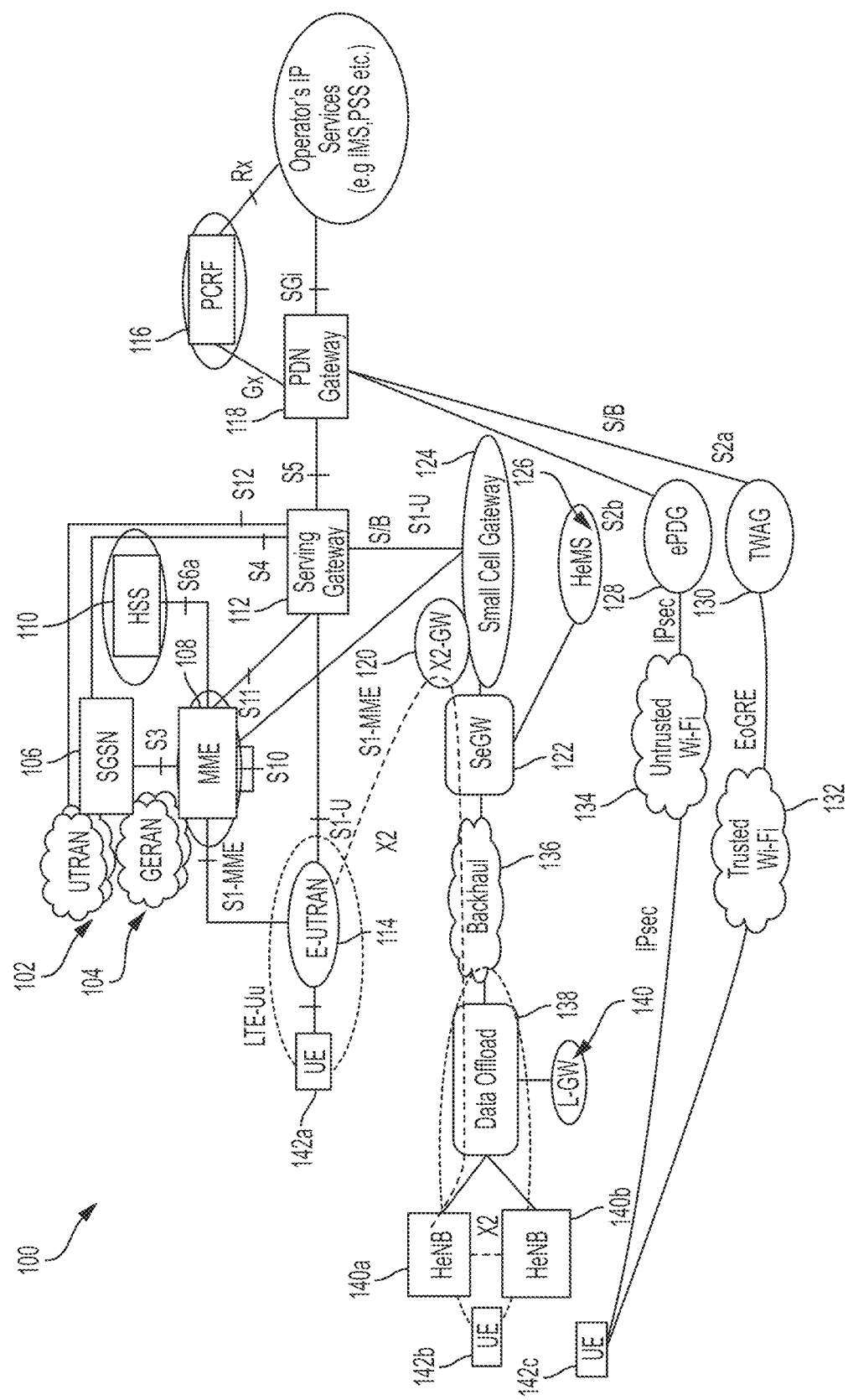
FIG. 1 shows an exemplary network, according to some examples.

Traditional deployments of EPC networks, such as the EPC network 100 shown in FIG. 1, do not allow separately scaling the data and control aspects of the network. As shown in FIG. 1, the EPC network 100 includes a Universal Terrestrial Radio Access Network (UTRAN) 102, a GSM EDGE Radio Access Network (GERAN) 104, a Serving General Packet Radio Service (GPRS) Support Node (SGSN) 106, Mobility Management Entity (MME) 108, a Home Subscriber Server (HSS) 110, a serving gateway 112, an Evolved UTRAN (E-UTRAN) 114, a Policy and Charging Rules Function (PCRF) 116, and a PDN gateway 118.

The EPC network 100 also includes X2 Gateway (X2-GW) 120, Service Gateway (SeGW) 122, a small cell gateway 124, (HeMS) 126, Evolved Packet Data Gateway (ePDG) 128, Trusted Wireless Access Gateway (TWAG) 130. The EPC network 100 includes three User Equipment (UEs) 142a-c. The TWAG 130 is in communication with UE 142c via the trusted Wi-Fi network 132, and the ePDG 128 is in communication with UE 142c via the untrusted Wi-Fi network 134. The SeGW 122 is in communication with the data offload component 138 via the backhaul network 136. The data offload component 138 is in communication with the Local Gateway (L-GW) 140, and Home eNodeB (HeNB)s 140a and 140b, which are in communication with UE 142b. The UE 142a is in communication with the network 100 via the E-UTRAN 114.

In particular, the serving gateway 112 routes and forwards user data packets. The serving gateway 112 can also act as the mobility anchor for the user plane during inter-eNodeB handovers and as the anchor for mobility between LTE and other 3GPP technologies. The serving gateway 112 manages and stores UE contexts, such as parameters of the IP bearer service, and network internal routing information. It also performs replication of the user traffic in case of lawful interception. The PDN gateway 118 provides connectivity from the UE to external packet data networks by serving as the point of exit and entry of traffic for the UE. The PDN gateway 118 can perform policy enforcement, packet filtering, charging support, lawful interception and packet screening. The PDN gateway 118 can act as the anchor for mobility between 3GPP and non-3GPP technologies (e.g., WiMAX).

The inventors have recognized and appreciated that it is desirable to decouple the data aspects from the control aspects of the EPC, such as those provided by the serving gateway 112 and/or the PDN gateway 118. Decoupling data from control can, for example, make it easier to separately scale the data and control aspects of the network (e.g., to scale each differently for different compute services). The techniques described herein, in some embodiments, provide for separate control plane(s) (e.g., for signaling) and data plane(s) (e.g., for data traffic, such as video, voice, and/or other data) in virtual EPC deployments. If, for example, there is a need to add data capacity, then the techniques can be used to create instantiation(s) of the data plane, without needing to add to the control plane unnecessarily. Similarly, for example, the data plane and/or control plane can be scaled back if the network is underutilizing the resources. This can allow for deployments that can be easily tailored to provide the amount of resources needed by the particular network.

The techniques described herein address throughput and scalability of an EPC in a virtual environment. In some embodiments, the techniques can be used to provide an elastic and linearly scalable EPC core (e.g., including a Packet Data Network Gateway (P-GW) and Serving Gateway (S-GW)) to support traffic for 5G mobile networks. In some examples, the techniques may provide one or more of the following features. The techniques can provide service transparency, such that a single control plane address presents the cluster as a single logical entity to adjacent network elements. The techniques can provide high data path performance. The techniques can provide vertical scaling up/down of any virtual machine (VM) within the virtual network function (VNF) cluster. The techniques can provide linear horizontal scaling (e.g., in/out) of session capacity and throughput. The techniques can provide multiple terabit throughput per cluster with optimal network bandwidth utilization. The techniques can provide a flexible high availability (HA) scheme, and/or support 1:1 hot standby or N:1 warm standby based on Service Level Agreement (SLA). The techniques can provide independent software upgrade/downgrade of each VM within the cluster. The techniques can enable sandbox on a live cluster to soak a new release before final deployment. These and other features will be described and further appreciated in view of the description herein.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

Figure 2:
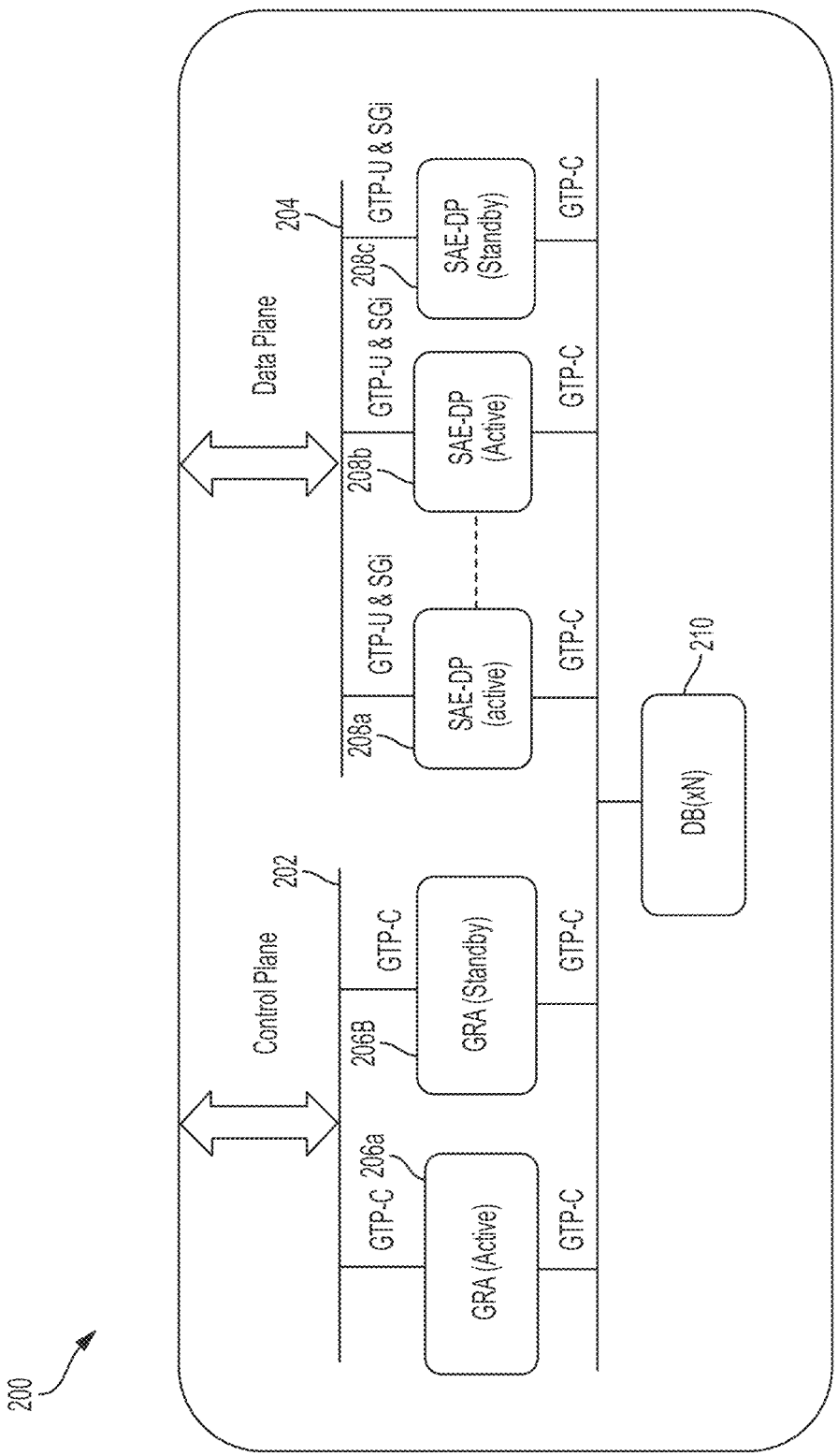
FIG. 2 shows an exemplary scalable system architecture evolution (SAE) gateway (SAE-GW), according to some embodiments.

FIG. 2 shows an exemplary scalable system architecture evolution (SAE) gateway (SAE-GW) 200, according to some embodiments. The SAE-GW 200 has a separate control plane 202 and data plane 204 to allow for separately scaling each plane. The control plane 202 is elastic in the sense that it can include any number of control plane components, such as GTP-C Routing Agents (GRAs). As shown in this non-limiting example, the control plane 202 includes active GRA 206a and standby GRA 206b (collectively referred to herein as GRAs 206). The data plane 204 is elastic in the sense that it can include any number of SAE data paths (SAE-DPs). As shown in this non-limiting example, the data plane includes three SAE-DPs 208a-208c (collectively referred to herein as SAE-DPs 208), where SAE-DP 208a and 208b are active and SAE-DP 208c is standby. The GRAs 206 and SAE-DPs 208 are in communication with a database (DB) 210 that can have multiple (n) instances. The DB 210 can save, for example, session state data and other relevant data used by the data and control planes 204, 206. The DB 210 can be used for various purposes, such as for recovery.

Each control plane component can be used within the core network for signaling, such as for signaling between GPRS gateway nodes and serving nodes to activate sessions, deactivate sessions, to adjust quality of service parameters. Referring further to FIG. 2, each GRA 206 can provide a single point to receive data, and can be configured to perform session distribution only on the control plane 204 (e.g., using GPRS Tunneling Protocol(GTP)-C). The GRAs can be configured as simple stateless and/or lightweight state-full GRAs.

Referring further to the control plane components (e.g., GRAs), the control plane 204 can include a GTP-C routing agent. The GTP-C routing agent can act as the entry point of the cluster of servers/VMs for the control plane (e.g., implementing the GRAs). For example, packet data network (PDN) connection requests can arrive at the GRAs via a single IP address that is configured as the GTP-C endpoint to the network, and the GTP-C routing agent can be used to perform routing and/or load balancing among the various GRAs in the control plane. Using a single entry point can, for example, provide service transparency by representing the cluster as one logical entity to external network functions. A GRA can route each new connection request to a selected backend SAE-DP in the data plane 206, using, e.g., an Access Point Name (APN) routing/policy table that routes based on criteria such as availability and/or capacity. The GTP-C routing agent can maintain stickiness for established sessions.

Each data plane component can be configured to provide the data path for sessions. The list below illustrates exemplary features of data plane components:

| | |
|---|---|
| 3GPP Release 13 compliant | Linear scalability of performance |
| Standalone PGW | Default bearer management |
| Standalone SGW | Dedicated bearer management |
| Combined SGW/PGW-SAE-GW | Multiple bearer support |
| Local Gateway-for SIPTO and LIPA | GTPv 1,v2 |
| EPC in a "box" for private LTE deployment | Gp and S8 support |
| | VRF support |
| Local Mobility Anchor point for eNB handover | VLAN |
| | DSCP to QCI mapping |
| Policy control enforcement for resource allocation and usage | Support BGPv4/6 and OSPFv2/3 |
| | IP address allocation-local or AAA |
| UE address allocation | IPv4 and IPv6 and dual stack IPv4/IPv6 support |
| Packet forwarding and routing | |
| Postpaid and Prepaid Charging Support | Packet filter configuration |
| 3GPP Gx and Gy compliant | Lawful Intercept Support |
| Control plane and user plane separation | X1_1 (administration) |
| Portable user plane | X2 (IRI) |
| Intel DPDK support | X3 (CC) |
| Shallow Packet Inspection | Virtual Access Point Names (APNs) |
| IP source address anti-spoofing | Idle and absolute session timeout |
| Fine granularity of end-to-end QoS (per service, per flow, per user) control | Direct tunnel support |
| | PDN type IPv4, IPv6, ad IPv4v6 |
| Per service data flow accounting and billing statistics | Disallow direct forwarding between mobile subscribers |
| Intra and Inter VNF redundancy | CDR generation |
| Geo-redundancy | Partial CDR per volume, time |
| Overlapping address support | Offline charging-Gz support |
| S2b support via GTPv2 | RADIUS authentication and accounting |
| S6b via Diameter | AAA server configuration |
| ACL | |
| API Service Enablement | |

Referring further to FIG. 2, the data plane 204 can be configured to provide a direct data plane (e.g., using GTP- U/SGi interface) to each SAE-DP server or virtual machine. An open protocol can be provided across all server and/or virtual machine interfaces for the GRAs and/or SAE-DPs. More DP nodes can be added, for example, to increase data throughput of the data plane 204. The data path can therefore be scaled up and down, as necessary. The direct data plane 206 can make use of the bandwidth more efficiently, e.g., compared to the data path going through distribution. For example, the direct data path can allow all session traffic to go directly to the destination to avoid consuming any additional bandwidth, e.g., which can help the techniques scale as necessary and efficiently utilize bandwidth.

Referring further to the data plane 206, a single IP address can be configured as the GTP-U endpoint (e.g., different than the IP address used for the control plane 204) to the network for the SAE-DPs. The data plane identifiers, such as fully qualified tunnel endpoint identifiers (FTEID), can be carried inside control plane messages, such that it can be automatically discovered by the satellite gateway (SGW). The SGW can be executed as a virtual network function, as discussed further in conjunction with FIG. 12. Different internal GTP-U endpoints enable data plane 206 traffic to be delivered directly to the particular virtual function or processing unit. Having separate GTP-U endpoints can allow the system to achieve a linear/unlimited horizontal scale (e.g., to multiple terabit throughput). The separate GTP-U endpoints can, for example, conserving network bandwidth. The data plane 206 can be flexibly configured for HA schemes, such that there is a N:1 warm standby configuration of SAE-DPs, and/or a 1:1 hot standby configuration. Different SLAs can be configured with different HA schemes. For example, SLAs can be configured for different public data networks (PDNs). For example, a SLA can be used to configure hot standby for an IP Multimedia Subsystem (IMS) PDN, a SLA can be used to configure warm standby for an iNET PDN, and/or the like.

In some embodiments, the SAE-GW 200 shown can be used to implement functions of the network 100 shown in FIG. 1, including core network architecture features of SAE. For example, the SAE-GW 200 can implement features of the serving gateway 112 and/or the PDN gateway 118. One of skill in the art will appreciate that the example GRA shown in FIG. 2 (e.g., and in other figures) can be used to handle any number of protocols. For example, the techniques can be used to handle a mobility protocol, DOC SIS, soft GRE, and/or any other protocol that can be expanded using the signaling and data plane techniques described herein.

Figure 3:
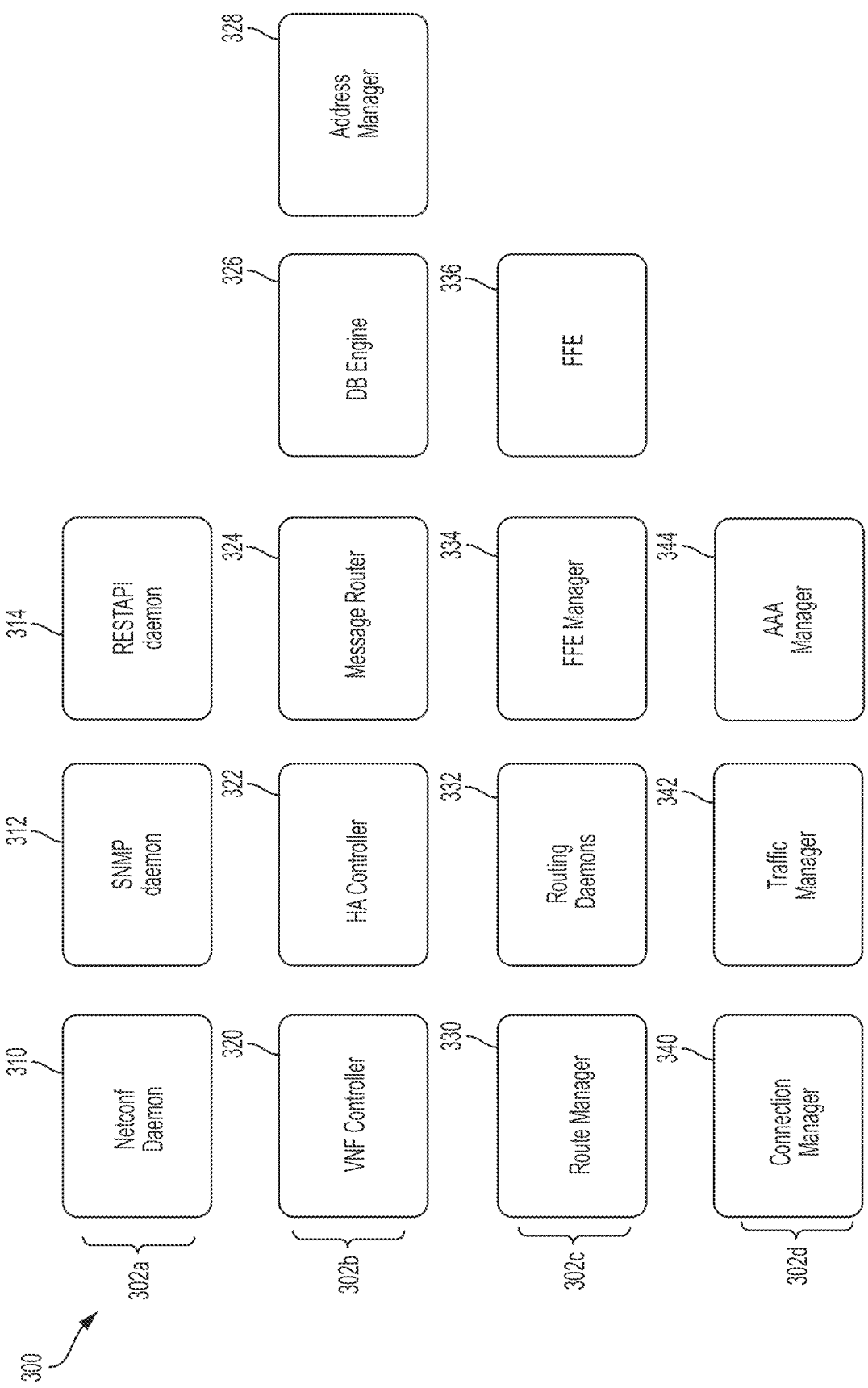
FIG. 3 shows an exemplary four layer task model, according to some embodiments.

FIG. 3 shows an exemplary four layer task model 300, according to some embodiments. The first layer 302a includes various daemons, including the Network Configuration Protocol (Netconf) Daemon 310, the Simple Network Management Protocol (SNMP) daemon 312, and the Representational State Transfer API (RESTAPI) daemon 314. The second layer 302b includes the Virtual Network Function (VNF) controller 320, the HA controller 322, the message router 324, the DB engine 326, and the address manager 328. The third layer 302c includes the route manager 330, the routing daemons 332, the FFE manager 334, and the FFE 336. The fourth layer 302d includes the connection manager 340, the traffic manager 342, and the authentication, authorization and accounting (AAA) manager 344.

Referring to the first layer 302a, the Netconf Daemon 310, SNMP daemon 312, and the RESTAPI daemon 314 provide different interfaces to interact with different external management and/or orchestration applications. For example, as discussed further below, the interfaces can be used to interface with a virtual network function (VNF) orchestration engine that can control the control and data plane components.

Referring to the second layer 302b, the VNF controller 320 can provide configuration management, resource monitoring, scaling service, and/or the like. The HA controller 322 can coordinate failure detection, task recovery, inter-VNF switchover, and/or the like. The message router 324 can provide an internal messaging service. The DB engine 326 can provide a unified mechanism to recover VNF state information after software and/or hardware failure. The address manager 328 provides address allocation service through, e.g., the local IP pool, through the Dynamic Host Configuration Protocol (DHCP) pool, and/or the like.

Referring to the third layer 302c, the route manager 330 and the routing daemons 332 implement routing protocols (e.g., border gateway protocol (BGP), Open Shortest Path First (OSPF), and/or the like). In some embodiments, the FFE manager 334 can provision the data path, and the FFE 336 can implement the actual data path lookup and forwarding.

Referring to the fourth layer 302d, the connection manager 340 handles the control path processing of a gateway. For example, the connection manager 340 performs internet key exchange (IKE) packet processing for the security gateway, IKE and GTP-C packet processing for evolved Packet Data Gateways (ePDG), and/or the like. The traffic manager 342 can handle the data path processing of a gateway. For example, the traffic manager 342 can provide uplink Encapsulating Security Payload (ESP) packet and downlink IP, GTP-U packet processing, and/or the like. The AAA manager 344 can provide AAA protocols, such as Remote Authentication Dial-In User Service (RADIUS) and/or Diameter client service to the SeGW (e.g., SeGW 122), ePDG (e.g., ePDG 128), and/or any other gateway services.

Figure 4:
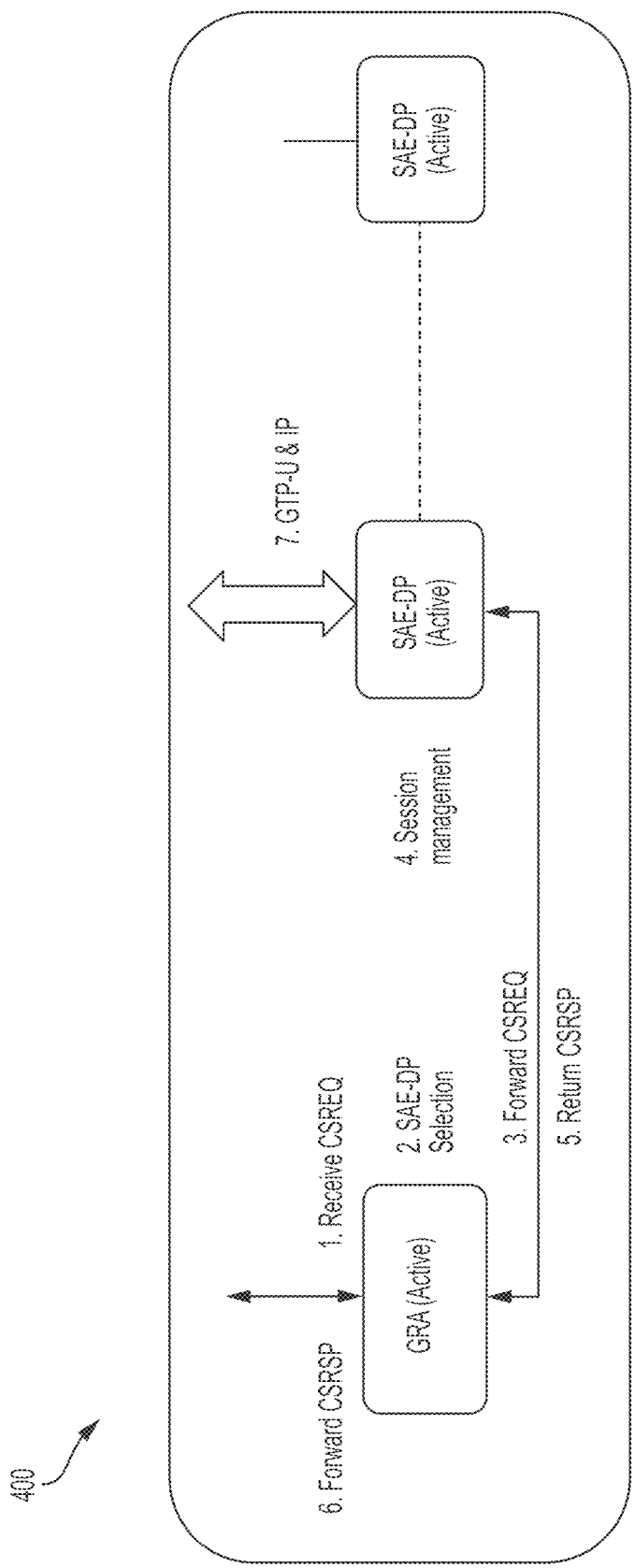
FIG. 4 shows an exemplary diagram of a call flow in a scalable evolved packet core, according to some embodiments.

FIG. 4 shows an exemplary diagram of a call flow 400 in a scalable evolved packet core, according to some embodiments. At step 1, the SAE-GW receives a create session request (CSREQ). At step 2, the GRA performs policy based routing to select a SAE-DP. At step 3, the GRA forwards the CSREQ to the selected SAE-GW. At step 4, the SAE-DP performs session management functions. The session management functions can include, for example, IP address allocation, control and data plane FTEID allocation, gateway interface (e.g., Gx, Gy interface) interaction, and/or the like. At step 5, the SAE-DP produces a Create Session Response (CSRSP) and transmits it back to the GRA. At step 6, the GRA forwards the CSRSP to the destination. As shown at step 7, a data path for the session is established directly with the SAE-DP (e.g., the session does not pass through the GRA and/or the control path).

Figure 5:
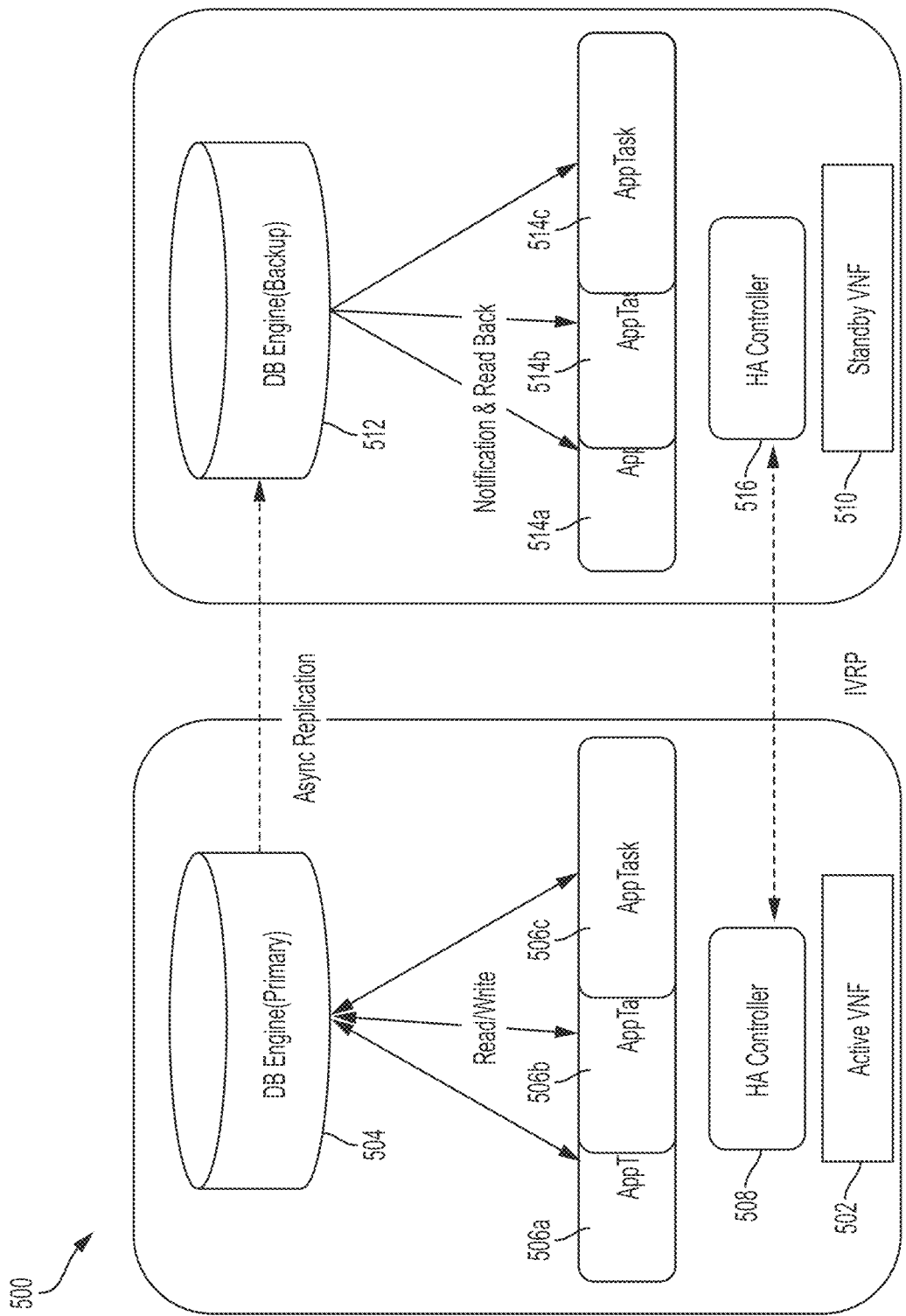
FIG. 5 shows a diagram of inter-VNF redundancy, according to some embodiments.

FIG. 5 shows a diagram 500 of inter-VNF redundancy, according to some embodiments. Such inter-VNF redundancy can be used to run control plane components, data plane components, or both. The active VNF 502 includes a primary DB engine 504, a set of application tasks (AppTask) 506 (shown as AppTasks 506a-506c), and a HA controller 508 (e.g., HA controller 322 in FIG. 3). The standby VNF 510 includes a backup DB engine 512, a set of application tasks (AppTask) 514 (shown as AppTasks 514a-514c), and a HA controller 516. The session state can be synchronized in real time between the active and standby VNFs 502, 510 through the DB layer. A session on the active VNF 502 can be pre-created on the standby VNF 510, e.g., even before a switch over occurs. This can be done, for example, to ensure minimal switchover time.

As discussed above, aspects of the data plane and the control plane can be run as network functions. The network functions can be virtualized and controlled using a virtualization control layer, such as an orchestration layer. The network function (NF) is a functional building block within a network infrastructure, which can include well-defined functional behavior for the particular function. A NF can be, for example, a network node or a physical appliance. A Virtualized Network Function (VNF) is a virtualization of a network element function, such that the function behavior and the external interface of the VNF is the same as its physical counterpart (PNF). A vVNF can be made of one or more virtual machines, in which case it is an aggregate VNF or a nested VNF.

Figure 6:
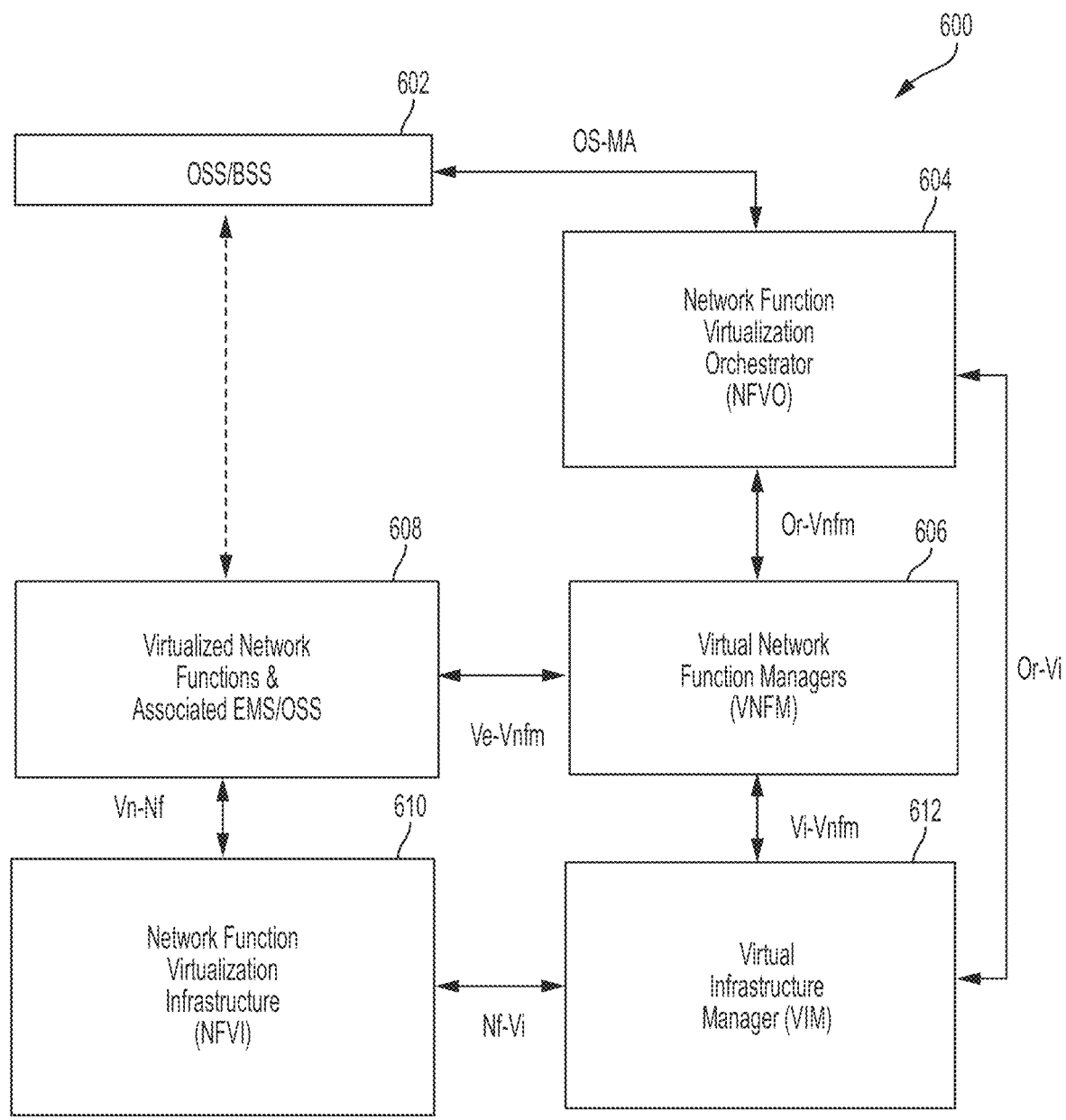
FIG. 6 shows a diagram of a reference architecture, according to some examples.

FIG. 6 shows a diagram of a reference architecture 600, according to some examples. The reference architecture 600 can be, for example, the ETSI NFV reference architecture. The architecture 600 includes the Operation Support System (OSS)/Business Support System (BSS) 602, the network function virtualization orchestrator (NFVO) 604, the virtual network function managers (VNFM) 606, the virtualized network functions and associated EMS/OSS 608, the network function virtualization structure (NFVI) 610, and the virtual infrastructure manager (VIM) 612.

The NFV includes a set of reference points, including: (a) the virtualization hardware resources (VI-Ha) (not shown in FIG. 6), (b) the NFV-NFVI (Vn-Nf), (c) the orchestrator (NFVO)-VNF Manager (Or-Vnfm), (d) the VIM-VNF Manager (Vi-Vnfm), (e) the orchestrator-VIM (Nf-Vi), (f) the OSS/BSS-NFV Management and Orchestration (OS-MA), (g) the VNF/Element Management System (EMS)-VNF Manager (Ve-Vnfm), and (h) the service, VNF and Infrastructure description-NFV Management and ORchestration (Se-MA).

The NFVI 610 refers to the totality of all hardware and software components that build up the environment in which VNFs are deployed. The NFVI 610 can span across several locations. The VIM 612 is the functionality that manages the interactions of a VNF with computing, storage, and networking resources. The VIM 612 can subsume infrastructure as a service (IaaS) functionalities. The VNFM 606 is responsible for VNF lifecycle management (e.g., creation, update, query, scaling, deletion, and/or the like). Multiple VNFMs 606 may be deployed, and/or a single VNFM 606 may serve multiple VNFs. The VNFM 606 can subsume a Platform as a Service (PaaS) lifecycle management functions. The NFVO 604 automates the deployment of the VNFs and the NFVI 610. The NF forwarding graph is a graph of logical links that connect NF nodes for the purpose of describing the traffic flow between the network function (e.g., a service chain). A VNF component (VNFC) is a subcomponent of a VNF executing in a discrete VM.

Figure 7:
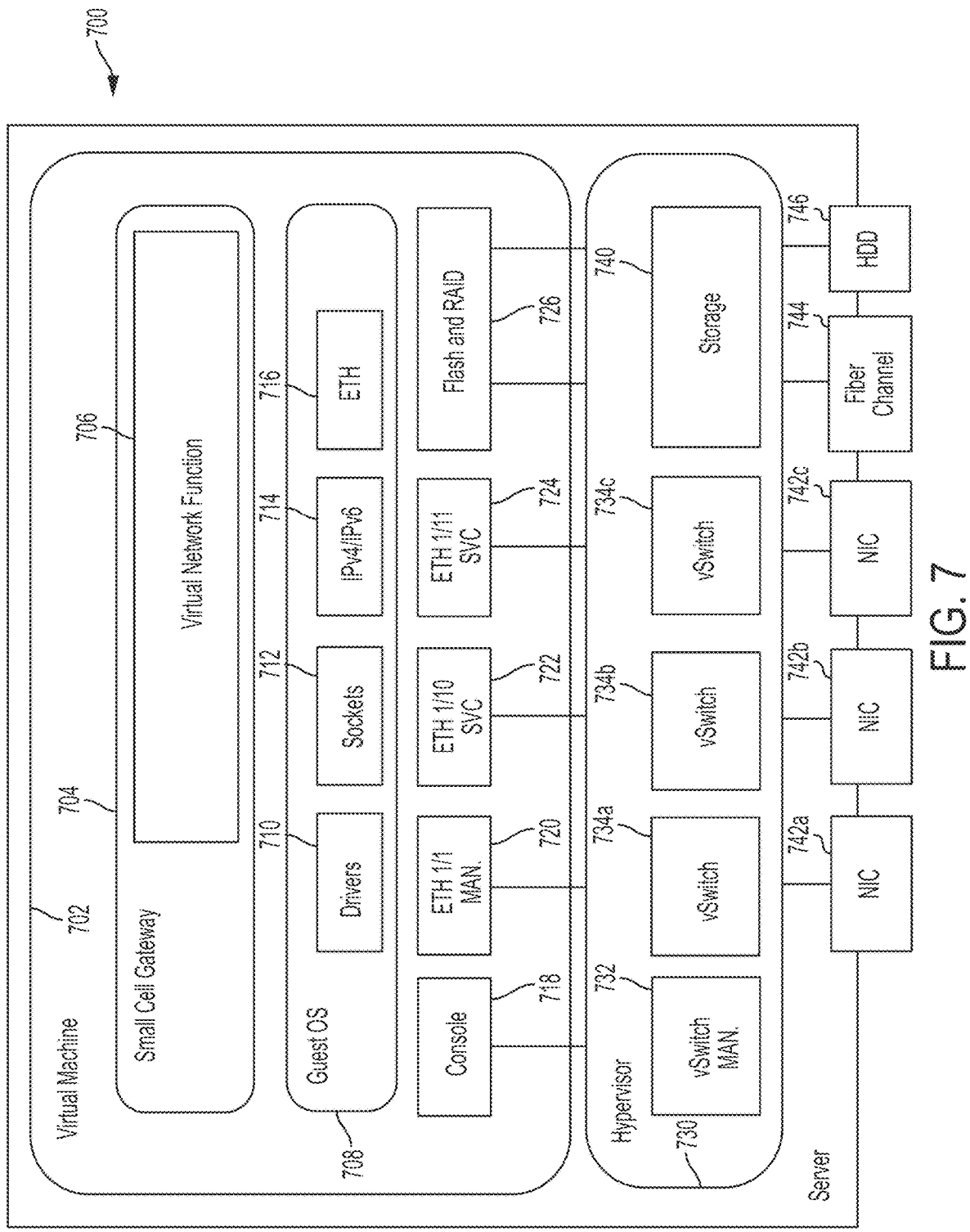
FIG. 7 shows a diagram of virtual network function realization, according to some embodiments.

FIG. 7 shows a diagram 700 of virtual network function realization, according to some embodiments. The diagram 700 includes a virtual machine 702 with a number of components, including the small cell gateway 704 (which includes the virtual network function 706). The virtual machine 702 also includes the guest operating system 708, which includes drivers 710, sockets 712, IPv4/IPv6 functionality 714, and Ethernet (ETH) 716. The virtual machine 702 also includes a console 718, the ETH 1/1 MAN 720, the ETH 1/10 SVC 722, the ETH 1/11 SVC 724, the ETH 1/1 MAN 726, and Flash and RAID memory interface 726. These components are in communication with the hypervisor 730. The hypervisor 730 includes the vSwitch Manager (MAN) 732, vSwitches 734a-c, and storage 736. The hypervisor 730 is in communication with various network interface cards NICs 742a-c, fiber channel 744, and hard disk drive (HDD) 746.

Figure 8:
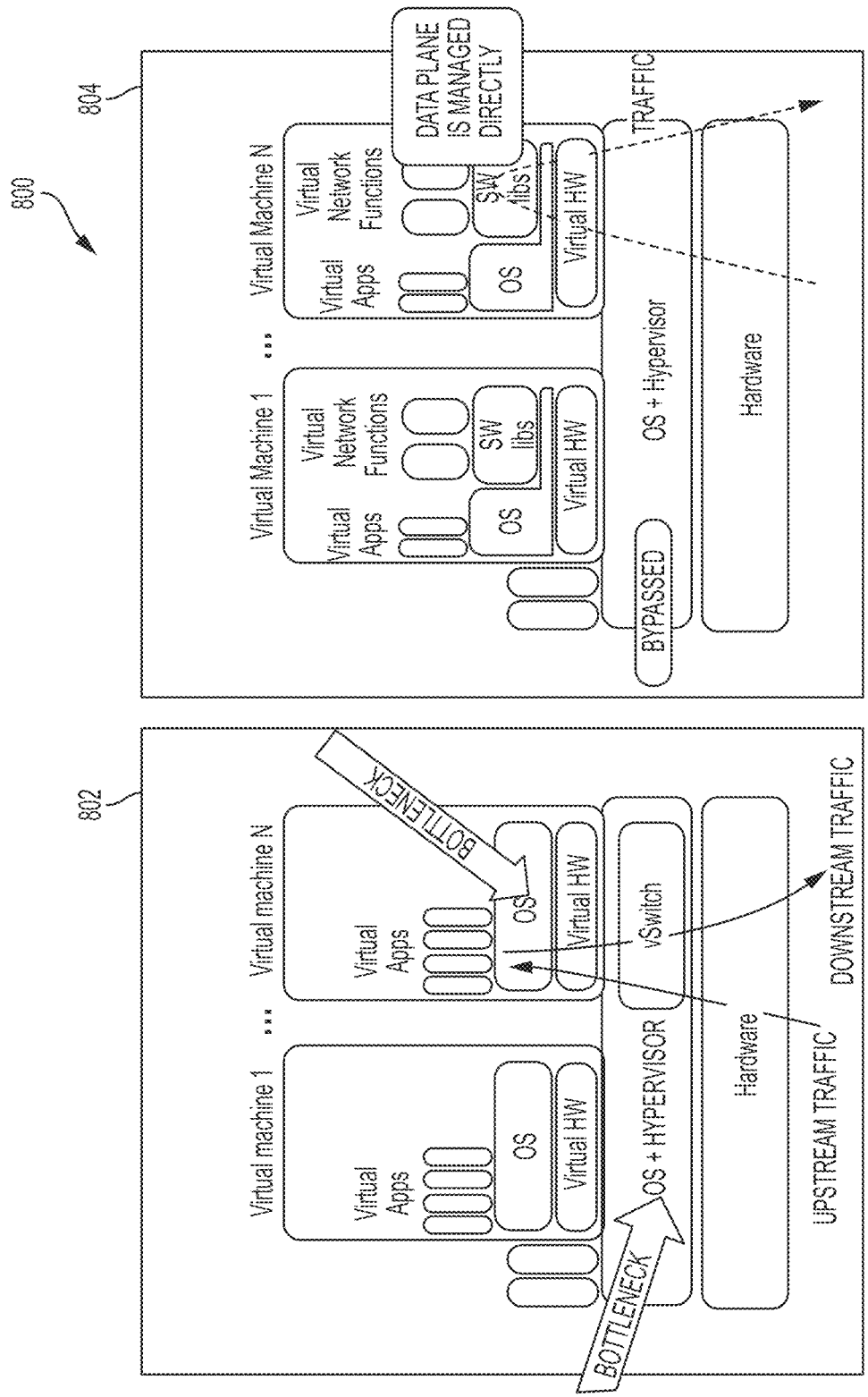
FIG. 8 shows a diagram of avoiding bottlenecks in the hypervisor and operating system, according to some embodiments.

FIG. 8 shows a diagram 800 of avoiding bottlenecks in the hypervisor and operating system, according to some embodiments. As shown in the virtual network configuration 802, the upstream traffic travels through the hypervisor to the virtual apps, and similarly the downstream traffic travels through the hypervisor back to the hardware. Thus, in the configuration 802, the hypervisor must process both the downstream and upstream traffic, which can create a bottleneck. Additionally, the virtual apps are all managed by the operating system, which can create another bottleneck. The virtual network configuration 804 bypasses the hypervisor, and also uses separate software libraries to execute virtual network functions. Thus, as shown in the virtual network configuration 804, the upstream traffic travels directly from the hardware into the directly managed data plane executing the virtual network functions, and similarly downstream traffic flows from the virtual network functions back to the hardware by bypassing the hypervisor. This configuration shown in 804 can avoid the bottlenecks that can be present with the configuration 802.

Figure 9:
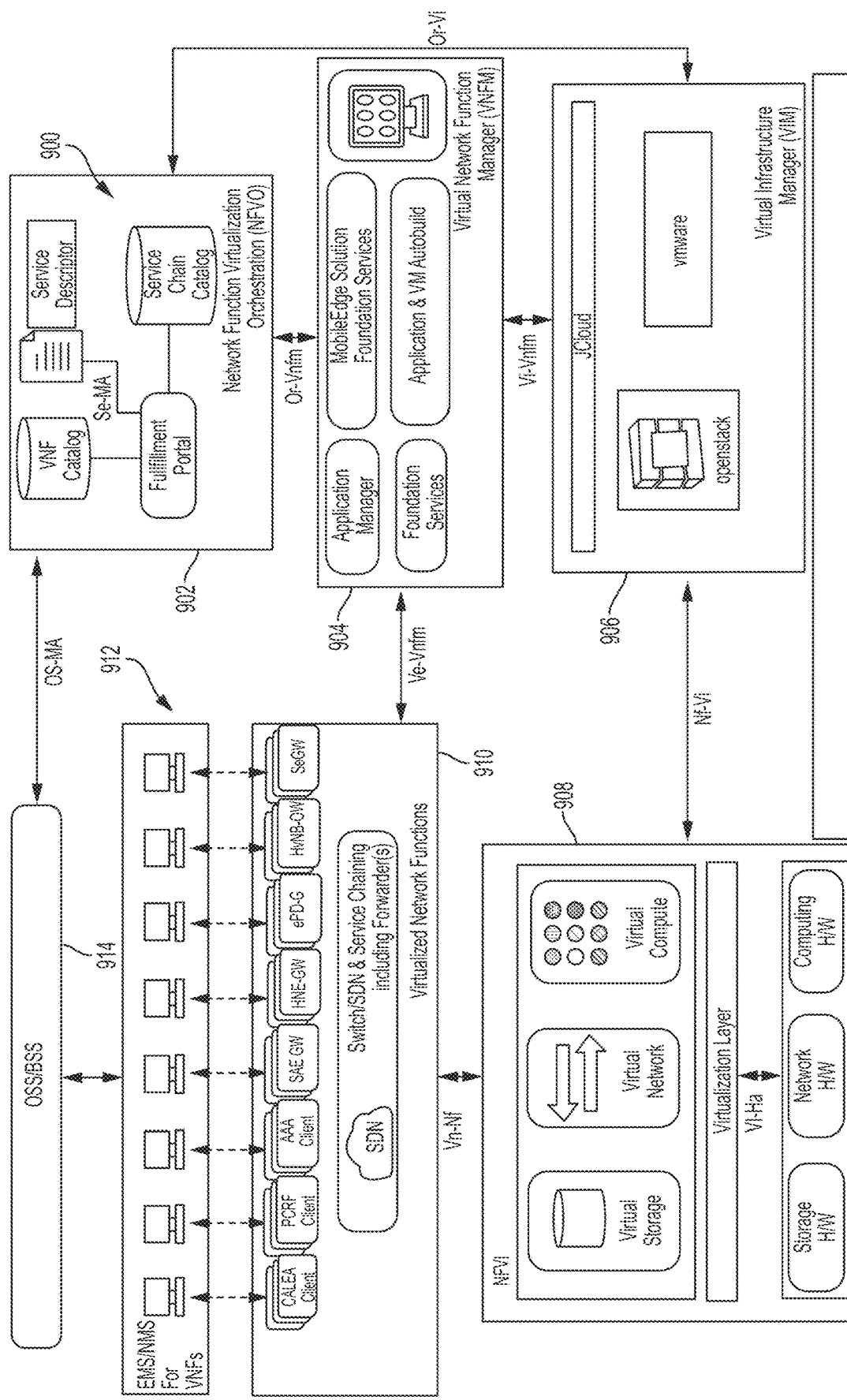
FIG. 9 shows an exemplary system for a scalable evolved packet core, according to some embodiments.

FIG. 9 shows an exemplary system 900 for a scalable evolved packet core, according to some embodiments. The system includes the NFVO 902, the VNFM 904, the VIM 906, the NFVI 908, VNFs 910, the EMS/Network Management System (NMS) for the VNFs 912, and the OSS/BSS 914. The NFVO 902 includes the VNF catalog, the service chain catalog, and the fulfillment portal, and interfaces with the service descriptor. The VNFM 904 includes the application manager, the foundation services, the MobileEdge solution foundation services, and the applications & VM auto-build. The VIM 906 runs software that can be used to set-up and control physical and virtual network resources, such as, e.g., openstack, vmware, and icloud. The NFVI 908 includes virtual storage, the virtual network, and the virtual compute aspects of the system 900, which communicate with the storage hardware, the network hardware, and the computing hardware via a virtualization layer. The VNF 910 includes virtual functions, including the Communications Assistance for Law Enforcement Act (CALEA) client, the Policy and Charging Rules Function (PCRF) client, the AAA client, the SAE-GW, the Home NodeB (HNB)-GW, the ePDG, the HeNB-GW and the SeGW, each of which can be associated with an EMS/NMS 912. The NFVO 902 is in communication with the VNFM 904 (e.g., via Or-Vnfm), the VIM 906 (e.g., via the Or-Vi), and the OSS/BSS 914 (e.g., via OS-MA). The VNFM 904 is in communication with the NFVO 902 as noted above, the VNFs 910 (e.g., via the Ve-Vnfm), and the VIM 906 (e.g., via the Vi-Vnfm). The VIM 906 is in communication with the NFVO 902 and the VNFM 904 as noted above, as well as the NFVI 908 (e.g., via Nf-Vi). The NFVI 908 is in communication with the VIM 906 as noted above, as well as the VNF 910 (e.g., via Vn-Nf). The VNF 910 are in communication with the OSS/BSS 914.

Figure 10:
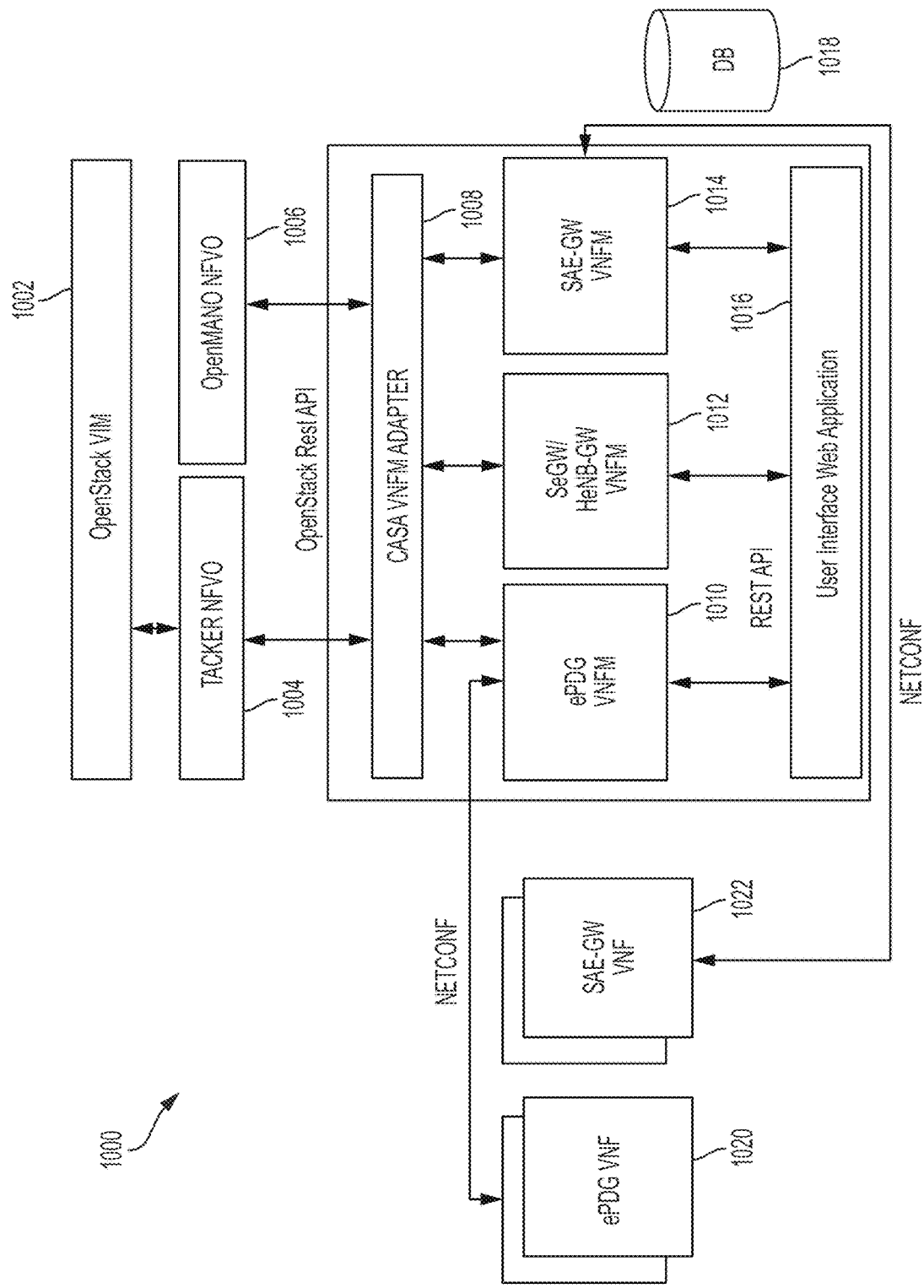
FIG. 10 shows VNFM and orchestration, according to some embodiments.

FIG. 10 is a diagram 1000 illustrating virtual network function management (VNFM) and orchestration, according to some embodiments. The diagram 1000 shows the OpenStack VIM 1002, the TACKER NFVO 1004, and the Open-MANO NFVO 1006. The diagram 1000 also show the VNFM Adapter 1008, which is interfacing with three VNFMs in this example: the ePDG VNFM 1010, the SeGW/HeNB-GW VNFM 1012, and the SAE-GW VNFM 1014.

The diagram 1000 also shows the user interface web application 1016, and the database 1018. The diagram 1000 also shows two VNFs: the ePDG VNF 1020 and the SAE-GW VNF 1022. The VNFM adapter 1008 is in communication with the NFVOs (TACKER NFVO 1004 and OpenMANO NFVO 1006). The VNFM adapter 1008 is in communication with the VNFMs (the ePDG VNFM 1010, the SeGW/HeNB-GW VNFM 1012, and the SAE-GW VNFM 1014). The VNFMs are in communication with the user interface web application 1016 via a REST API. The VNFs can be in communication with the VNFMs. As shown in the diagram 1000, the ePDF VNF 1020 is in communication with the ePDG VNFM 1010, and the SAE-GW VNF 1022 is in communication with the SAE-GW VNFM 1014 (e.g., via NETCONF, as shown in this example).

Figure 11:
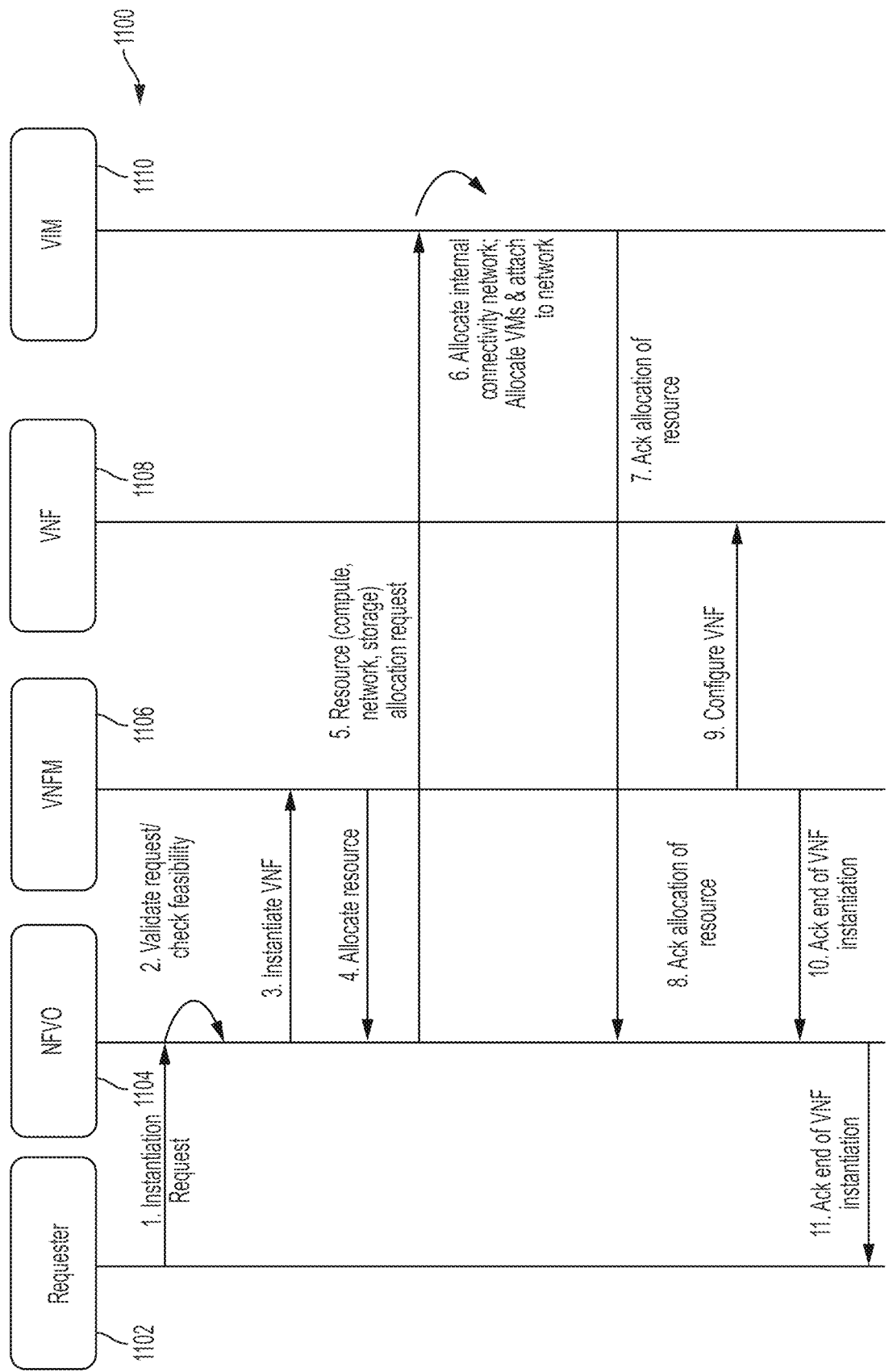
FIG. 11 shows a diagram of a VNF call flow, according to some embodiments.

FIG. 11 shows a diagram of a VNF call flow 1100, according to some embodiments. The call flow is among the following network components: the requester 1102 (e.g., a UE), the NFVO 1104 (e.g., the TRACKER NFVO 1004 and/or the OpenMANO NFVO 1006 in FIG. 10), the VNFM 1106 (e.g., one of the VNFMs shown in FIG. 10, e.g., the ePDG VNFM 1010, the SeGW/HeNB-GW VNFM 1012, and/or the SAE-GW VNFM 1014), the VNF 1108 (e.g., one of the VNFs shown in FIG. 10, e.g., the ePDG VNF 1020 and/or the SAE-GW VNF 1022), and the VIM 1110 (e.g., the OpenStack VIM 1002 in FIG. 10).

At step 1, the requester 1102 sends a request with needed parameters to the NFVO 1104 (the orchestrator) to instantiate a VNF instance. At step 2, the NFVO 1104 validates the request and (optionally) checks the feasibility of the request. At step 3, the NFVO 1104 instructs the VNFM 1106 to instantiate the FNV. At step 4, the VNFM 1106 requests the NFVO 1104 to allocate the required compute/network resources. At step 5, the NFVO 1104 sends the resource allocation request to the selected VIM 1110 for execution. At step 6, the VIM 1110 allocates/creates the VMs as per the Virtual Deployment Unit (VDU), creates the needed internal/external connectivity, and attaches VMs to the network. At step 7, the VIM 1110 sends the VNF 1108 an acknowledgement of the completion of resource allocation to the NFVO 1104. At step 8, the NFVO 1104 acknowledges the completion of resources allocated to the VNFM 1106, returning appropriate configuration information. At step 9, the VNFM 1106 configures the VNF 1108 with any VNF-specific parameters (e.g., using the get/create/set config object operations over the VNF configuration interface). At step 10, the VNFM 1106 acknowledges the completion of the VNF instantiation to the NFVO 1104. At step 11, the NFVO 1104 acknowledges the completion of the VNF instantiation to the requester 1102.

In some examples, an orchestration example can be implemented in the following manner. An XML document (e.g., <service-request>) can be generated and sent to the VNFM, which creates the active VMs and standby VMs (e.g., hot-standby). The service can start and report the application statistics to the VNFM (e.g., that the status is OK). As the load increases, VMs start to get overloaded, and can report the overload to the VNFM (e.g., with a status of OVERLOAD). The VNFM can activate one or more standby VMs and add them to the running service. This can cause the load on at the VMs to decrease below the overload threshold. The VNFM can backfill the standby queue by booting new VMs (e.g., the same number activated), but wait to activate the new VMs if/until an overload of the currently activated VMs.

Figure 12:
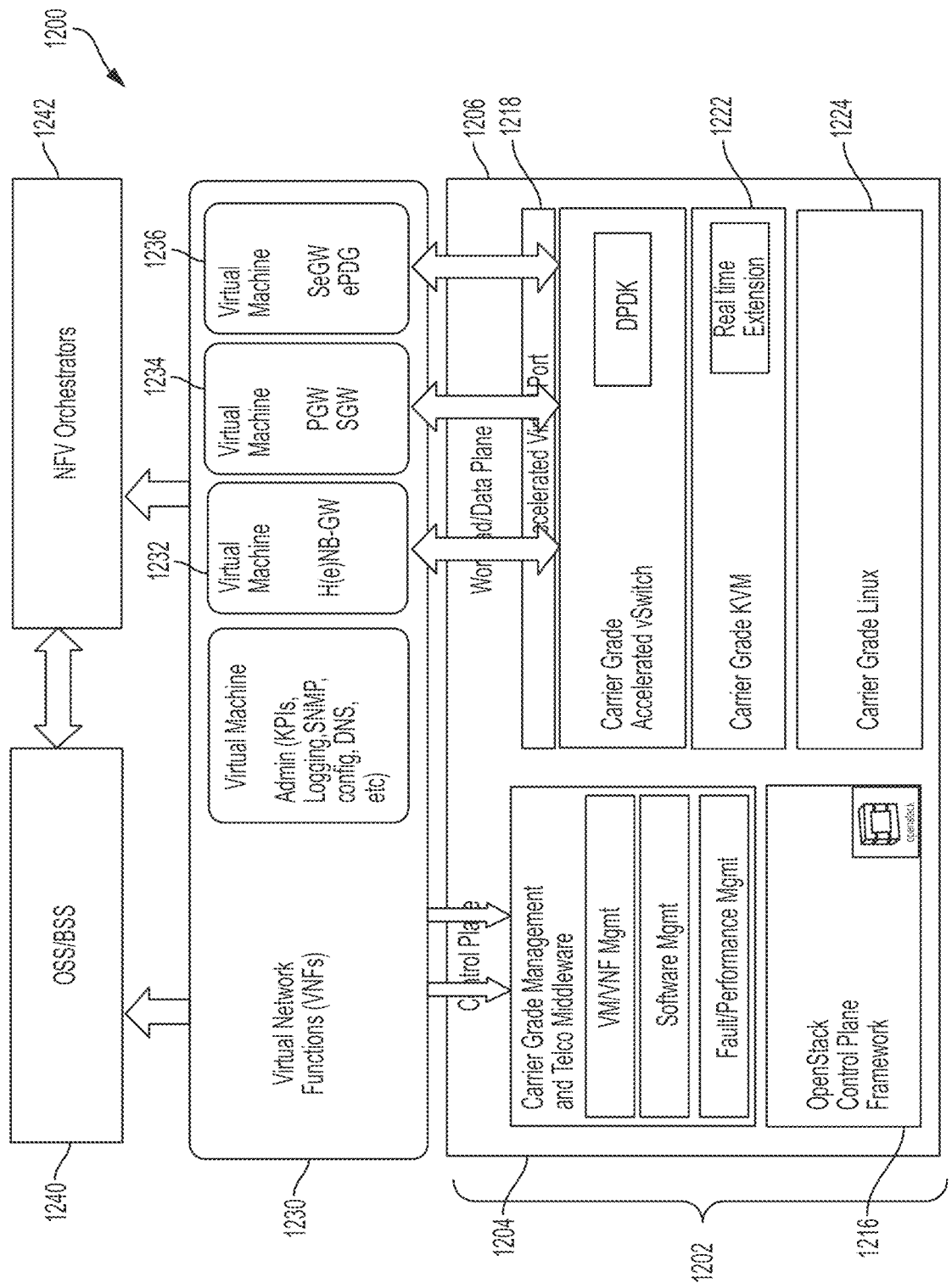
FIG. 12 shows a virtualization solution leveraging a mobile edge computing platform, according to some embodiments.

FIG. 12 shows a virtualization solution 1200 leveraging a mobile edge computing (MEC) platform 1202, according to some embodiments. The MEC platform 1202 can be implemented on, for example, COTS x86 hardware (e.g., 1RU/2RU). The MEC platform 1202 can provide an ETSI NFV-compliant cloud solution, including providing a separate control plane 1204 and workload/data plane 1206, as discussed herein. The control plane 1204 can include carrier grade management and telco middleware 1208, including VM/VNF management 1210, software management 1212, and fault/performance management 1214. The MEC platform 1202 can run an OpenStack control plane framework 1216. The workload/data plane 1206 can include an accelerate virtual port 1220, a carrier grade accelerated vSwitch 1222, and carrier grade Linux 1224.

The VNFs 1230 can interface with the control plane 1204 and the workload/data plane 1206. The VNFs 1230 can include a number of virtual machines for, e.g., as shown in this example, the a virtual machine 1232 running the H(e)NB-GW, a virtual machine 1234 running the PGW and SGW, and a virtual machine 1236 running the SeGW and the ePDG. The VNFs 1230 communicate with the OSS/BSS 1240 and the NFV Orchestrators 1242.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A computerized method for providing a distributed core framework for a voice and data network, the method comprising:
    executing a control plane comprising a set of control plane components associated with the control plane, comprising:
        executing the set of control plane components using a set of virtual machines running on a first set of computing devices associated with the control plane; and
        providing a first network interface for the control plane to the voice and data network, wherein the first network interface is shared by the set of control plane components;
    executing a data plane comprising a set of data plane components associated with the data plane, comprising:
        executing the set of data plane components using a set of virtual machines running on a second set of computing devices associated with the data plane; and
        providing a second network interface for the data plane to the voice and data network, wherein the second network interface is shared by the set of data plane components;
    executing a network function virtualization orchestration layer to coordinate execution of the set of control plane components and the set of data plane components;
    receiving, via the first network interface, a session request from a remote device;
    processing, using a first control plane component from the set of control plane components, the session request to configure a selected data plane component from the set of data plane components to handle a session created for the session request, such that the selected data plane component bypasses the network function virtualization orchestration layer and can directly communicate with the remote device using the second network interface to handle the session.

2. The method of claim 1, wherein configuring the selected data plane component comprises:
    performing policy-based routing to select the selected data plane component from the set of data plane components;
    forwarding, by the first control plane component, the session request to the selected data plane component;
    performing, by the selected data plane component, session management functions to create the session;
    sending, by the selected data plane component, a create session response to the first control plane component to establish a data path for the session with the selected data plane component through the second network interface.

3. The method of claim 1, further comprising:
    determining a load of the set of control plane components is above a threshold; and
    instantiating a new control plane component for the control plane to increase a capacity of the control plane.

4. The method of claim 1, further comprising:
    determining a load of the set of data plane components is above a threshold; and
    instantiating a new data plane component for the data plane to increase a capacity of the data plane.

5. The method of claim 1, further comprising:
    determining a load of the set of control plane components is below a threshold; and
    removing a control plane component from the set of control plane components to reduce a capacity of the control plane.

6. The method of claim 1, further comprising:
    determining a load of the set of data plane components is below a threshold; and
    removing a data plane component from the set of data plane components to reduce a capacity of the data plane.

7. The method of claim 1, further comprising configuring the data plane to run a high availability configuration, comprising:
    executing a first set of the data plane components in an active mode, such that the first set of data plane components can be selected to process sessions; and
    executing a second set of the data plane components in a standby mode, such that one or more of the second set of data plane components can be switched to the active mode in response to unavailability of one or more of the first set of data plane components, such that sessions can be maintained by the second set of data plane components.

8. The method of claim 1, wherein bypassing the network function virtualization orchestration layer comprises:
executing software libraries separate from the virtualization orchestration layer to process traffic between hardware and virtual network functions of the data plane components.

9. The method of claim 1, wherein executing the control plane and executing a data plane comprises:
executing the set of control plane components using a set of virtual machines running on a first set of computing devices at a network edge; and
executing the set of data plane components using a set of virtual machines running on a second set of computing devices at the network edge.

10. The method of claim 1, wherein executing a network function virtualization orchestration layer to coordinate execution of the set of control plane components and the set of data plane components comprises:
instantiating the set of virtual machines running on the first set of computing devices, comprising instantiating a first set of active virtual machines and a first set of standby virtual machines;
instantiating the set of virtual machines running on the second set of computing devices, comprising instantiating a second set of active virtual machines and a second set of standby virtual machines;
monitoring reported application statistics from the first and second sets of active virtual machines, wherein the application statistics comprise a measure of utilization of the first and second sets of active virtual machines to execute the set of control plane components and the set of data plane components;
determining, based on the reported application statistics, the first set of active virtual machines, the second set of active virtual machines, or both, are above a threshold; and
activating a standby virtual machine from the first set of standby virtual machines, the second set of standby virtual machines, or both, to decrease utilization of active virtual machines.

11. An apparatus configured to provide a distributed core framework for a voice and data network, the apparatus comprising a processor in communication with memory and a set of additional processing resources, the processor being configured to execute instructions stored in the memory that cause the processor to:
execute a control plane comprising a set of control plane components associated with the control plane, comprising:
executing the set of control plane components using a set of virtual machines running on a first portion of the set of processing resources; and
providing a first network interface for the control plane to the voice and data network, wherein the first network interface is shared by the set of control plane components;
execute a data plane comprising a set of data plane components associated with the data plane, comprising:
executing the set of data plane components using a set of virtual machines running on a second portion of the set of processing resources; and
providing a second network interface for the data plane to the voice and data network, wherein the second network interface is shared by the set of data plane components;
executing a network function virtualization orchestration layer to coordinate execution of the set of control plane components and the set of data plane components;
receive, via the first network interface, a session request from a remote device;
process, using a first control plane component from the set of control plane components, the session request to configure a selected data plane component from the set of data plane components to handle a session created for the session request, such that the selected data plane component bypasses the network function virtualization orchestration layer and can directly communicate with the remote device using the second network interface to handle the session.

12. The apparatus of claim 11, wherein the instructions are further configured to cause the apparatus to:
perform policy-based routing to select the selected data plane component from the set of data plane components;
forward, by the first control plane component, the session request to the selected data plane component;
perform, by the selected data plane component, session management functions to create the session;
send, by the selected data plane component, a create session response to the first control plane component to establish a data path for the session with the selected data plane component through the second network interface.

13. The apparatus of claim 11, wherein the instructions are further configured to cause the apparatus to:
determine a load of the set of data plane components is above a threshold; and
instantiate a new data plane component for the data plane to increase a capacity of the data plane.

14. The apparatus of claim 11, wherein the instructions are further configured to cause the apparatus to:
determine a load of the set of data plane components is below a threshold; and
remove a data plane component from the set of data plane components to reduce a capacity of the data plane.

15. The apparatus of claim 11, wherein the instructions are further configured to cause the apparatus to configure the data plane to run a high availability configuration, comprising:
executing a first set of the data plane components in an active mode, such that the first set of data plane components can be selected to process sessions; and
executing a second set of the data plane components in a standby mode, such that one or more of the second set of data plane components can be switched to the active mode in response to unavailability of one or more of the first set of data plane components, such that sessions can be maintained by the second set of data plane components in the event of unavailability of one or more of the first set of data plane components.

16. At least one non-transitory computer-readable storage medium encoded with a plurality of computer-executable instructions that, when executed, perform a method comprising:
executing a control plane comprising a set of control plane components associated with the control plane, comprising:
executing the control plane components using a set of virtual machines running on a first set of computing devices associated with the control plane; and providing a first network interface for the control plane to a voice and data network, wherein the first network interface is shared by the set of control plane components;

executing a data plane comprising a set of data plane components associated with the data plane, comprising:
executing the data plane components using a set of virtual machines running on a second set of computing devices associated with the data plane; and
providing a second network interface for the data plane to the voice and data network, wherein the second network interface is shared by the set of data plane components;

executing a network function virtualization orchestration layer to coordinate execution of the set of control plane components and the set of data plane components;

receiving, via the first network interface, a session request from a remote device;

processing, using a first control plane component from the set of control plane components, the session request to configure a selected data plane component from the set of data plane components to handle a session created for the session request, such that the selected data plane component bypasses the network function virtualization orchestration layer and can directly communicate with the remote device using the second network interface to handle the session.

17. The non-transitory computer-readable storage medium of claim 16, wherein configuring the selected data plane component comprises:
performing policy-based routing to select the selected data plane component from the set of data plane components;
forwarding, by the first control plane component, the session request to the selected data plane component;
performing, by the selected data plane component, session management functions to create the session;
sending, by the selected data plane component, a create session response to the first control plane component to establish a data path for the session with the selected data plane component through the second network interface.

18. The non-transitory computer-readable storage medium of claim 16, the method further comprising:
determining a load of the set of data plane components is above a threshold; and
instantiating a new data plane component for the data plane to increase a capacity of the data plane.

19. The non-transitory computer-readable storage medium of claim 16, the method further comprising:
determining a load of the set of control plane components is below a threshold; and
removing a control plane component from the set of control plane components to reduce a capacity of the control plane.

20. The non-transitory computer-readable storage medium of claim 16, the method further comprising:
determining a load of the set of data plane components is below a threshold; and
removing a data plane component from the set of data plane components to reduce a capacity of the data plane.

21. The non-transitory computer-readable storage medium of claim 16, the method further comprising configuring the data plane to run a high availability configuration, comprising:
executing a first set of the data plane components in an active mode, such that the first set of data plane components can be selected to process sessions; and
executing a second set of the data plane components in a standby mode, such that one or more of the second set of data plane components can be switched to the active mode in response to unavailability of one or more of the first set of data plane components, such that sessions can be maintained by the second set of data plane components.

* * * * *